US006654022B1

(12) United States Patent
Egan

(10) Patent No.: US 6,654,022 B1
(45) Date of Patent: Nov. 25, 2003

(54) METHOD AND APPARATUS FOR LOOKAHEAD GENERATION IN CACHED COMPUTER GRAPHICS SYSTEM

(75) Inventor: Kenneth William Egan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,446

(22) Filed: Sep. 30, 1999

(51) Int. Cl.[7] .......................... G06T 1/00; G06F 13/00; G09G 5/36
(52) U.S. Cl. ...................... 345/557; 345/501; 345/537; 345/556
(58) Field of Search ............................... 345/441, 501, 345/505; 711/213, 136, 137

(56) References Cited

U.S. PATENT DOCUMENTS

| | | | | |
|---|---|---|---|---|
| 5,136,664 A | * | 8/1992 | Bersack et al. ............. | 345/441 |
| 5,694,568 A | * | 12/1997 | Harrison, III et al. ...... | 711/213 |
| 6,084,599 A | * | 7/2000 | Nakatsuka et al. ......... | 345/501 |

* cited by examiner

Primary Examiner—Matthew C. Bella
Assistant Examiner—Dalip K. Singh
(74) Attorney, Agent, or Firm—Duke W. Yee; Mark E. McBurney; Lisa L.B. Yociss

(57) ABSTRACT

A method and apparatus for generation of pixel lookahead information in a cached computer graphics system is provided. For each pixel-based memory operation, several data items may be generated, such as numerical values representing a coordinate point in an image coordinate space or display coordinate space and characteristic data representing a color value or depth value for the pixel. In addition, lookahead data correlated with the coordinate data is generated. The pixel operation is then issued with the characteristic data, the coordinate data, and the lookahead data. The lookahead data may contain a lookahead vector, which specifies a lookahead vector direction and a lookahead vector length, and a lookahead valid flag, which indicates whether associated lookahead data is valid for the pixel operation. The lookahead direction may be computed based on the coordinate data of the pixel operation and coordinate data for a pixel operation to be performed within a threshold number of pixels operations from the pixel operation. By providing lookahead information based on the rendering state of the graphics subsystem, pixel operation intentions may be indicated prior to the issuance of a pixel operation so that the pixel data may be prefetched into a cache.

24 Claims, 7 Drawing Sheets

Directions
0 - drawing up
1 - drawing up and to the right
2 - draw right
3 - draw down to right
4 - draw down
5 - draw down and left
6 - draw left
7 - draw up and left

METHOD AND APPARATUS FOR LOOKAHEAD GENERATION IN CACHED COMPUTER GRAPHICS SYSTEM

BACKGROUND OF THE INVENTION

1. Technical Field

The present invention relates to an improved data processing system and, in particular, to a method and system for computer graphics processing system, specifically, data transfer between graphic system components.

2. Description of Related Art

Computer graphic processing is computationally expensive. Data processing systems usually contain several performance enhancements for increasing the speed at which computer graphics can be generated, but these enhancements may be accompanied by quality tradeoffs.

The efficiency of the memory utilization is one factor affecting the efficiency of computer graphic processing. Rapid advances in integrated circuit technology and in computer architecture have resulted in an increasing "memory reference delay gap" between relatively fast processing units and relatively slow memory. High performance processors with high throughput are available as commercial products. However, in order to run at their peak speeds, these high performance systems require memory systems that are able to send data to the processor as fast as the processor requires, otherwise the processor stalls while it is waiting for data to be delivered. Such memory systems may be complex and/or expensive. As a result, the performance bottleneck of many current high performance computer systems is not the speed of the processor but rather the efficiency of the memory system.

In order to overcome the problem of an increasingly large memory reference delay gap between fast processing units and slow memory, cache memories are used. Cache memory is a small, high speed memory between a processor or processors and a memory subsystem of a computer system. Its primary purpose is to provide high speed data/instruction accesses without the associated cost of an entire memory that uses high speed technology. This is achieved by keeping data and/or instructions that are expected to be referenced in the near future in the cache.

When the required data for a requested memory transaction exists in the cache, a "cache hit" is said to occur, and the required data does not need to be fetched from slower, main memory. In contrast, when the required data for a requested memory transaction does not exist in the cache, a "cache miss" is said to occur, and the required data must be fetched from slower, main memory. Cache misses are problematic because the amount of data that can be processed is limited to the speed at which data can be fetched from main memory. In general, system designers attempt to improve the cache hit ratio so that the number of cache misses are reduced and better performance can be obtained. As used herein, the term "cache hit ratio" is defined as the probability that a data item requested by a processor unit will be found in the cache, and the "cache miss penalty" is defined as the time that the processing unit is required to wait for the requested data item to arrive when a cache miss occurs.

The prior art teaches a technique known as prefetching in which data items are brought into the cache memory before they are actually needed. If the prefetching correctly anticipates the memory reference behavior of a program, then memory reference delay times can be overlapped with program execution—at least partially overlapped and preferably completely overlapped. The number of cache misses can then be reduced, and the performance of the program is increased.

Data reference behavior is often considered generally random, and most prior art techniques teach a simple prefetch of data items consecutively in front of or behind a current memory reference. With this type of cache behavior, cache space may be wasted to store prefetched, non-referenced data, and data items in the cache that are going to be referenced shortly might be replaced by non-referenced data.

Therefore, it would be advantageous to provide more efficient graphics memory operations so that a graphics processor does not stall while waiting for data retrieval, thereby increasing the performance of the graphics processor.

SUMMARY OF THE INVENTION

A method and apparatus for generation of pixel lookahead information in a cached computer graphics system is provided. For each pixel-based memory operation, several data items may be generated, such as numerical values representing a coordinate point in an image coordinate space or display coordinate space and characteristic data representing a color value or depth value for the pixel. In addition, lookahead data correlated with the coordinate data is generated. The pixel operation is then issued with the characteristic data, the coordinate data, and the lookahead data. The lookahead data may contain a lookahead vector, which specifies a lookahead vector direction and a lookahead vector length, and a lookahead valid flag, which indicates whether associated lookahead data is valid for the pixel operation. The lookahead direction may be computed based on the coordinate data of the pixel operation and coordinate data for a pixel operation to be performed within a threshold number of pixels operations from the pixel operation. By providing lookahead information based on the rendering state of the graphics subsystem, pixel operation intentions may be indicated prior to the issuance of a pixel operation so that the pixel data may be prefetched into a cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
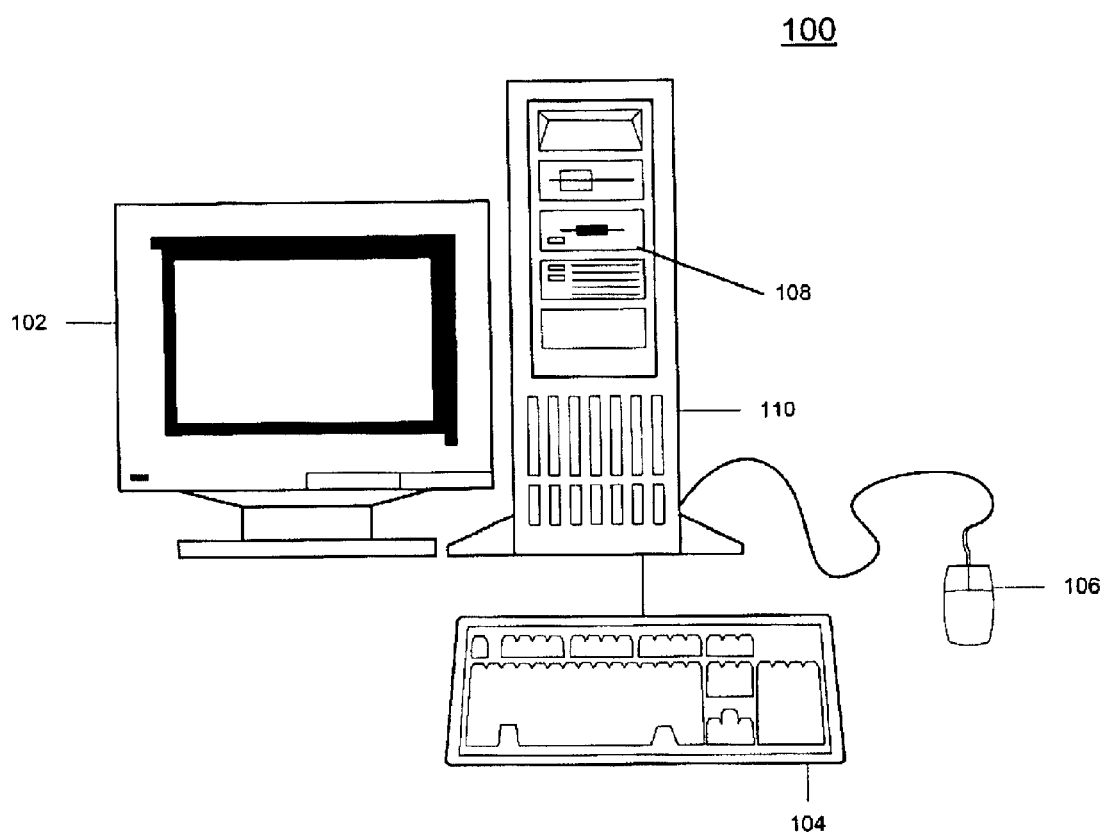
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system. Although the depicted representation shows a workstation-type computer, other embodiments of the present invention may be implemented in other types of data processing systems, such as network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

Figure 2A:
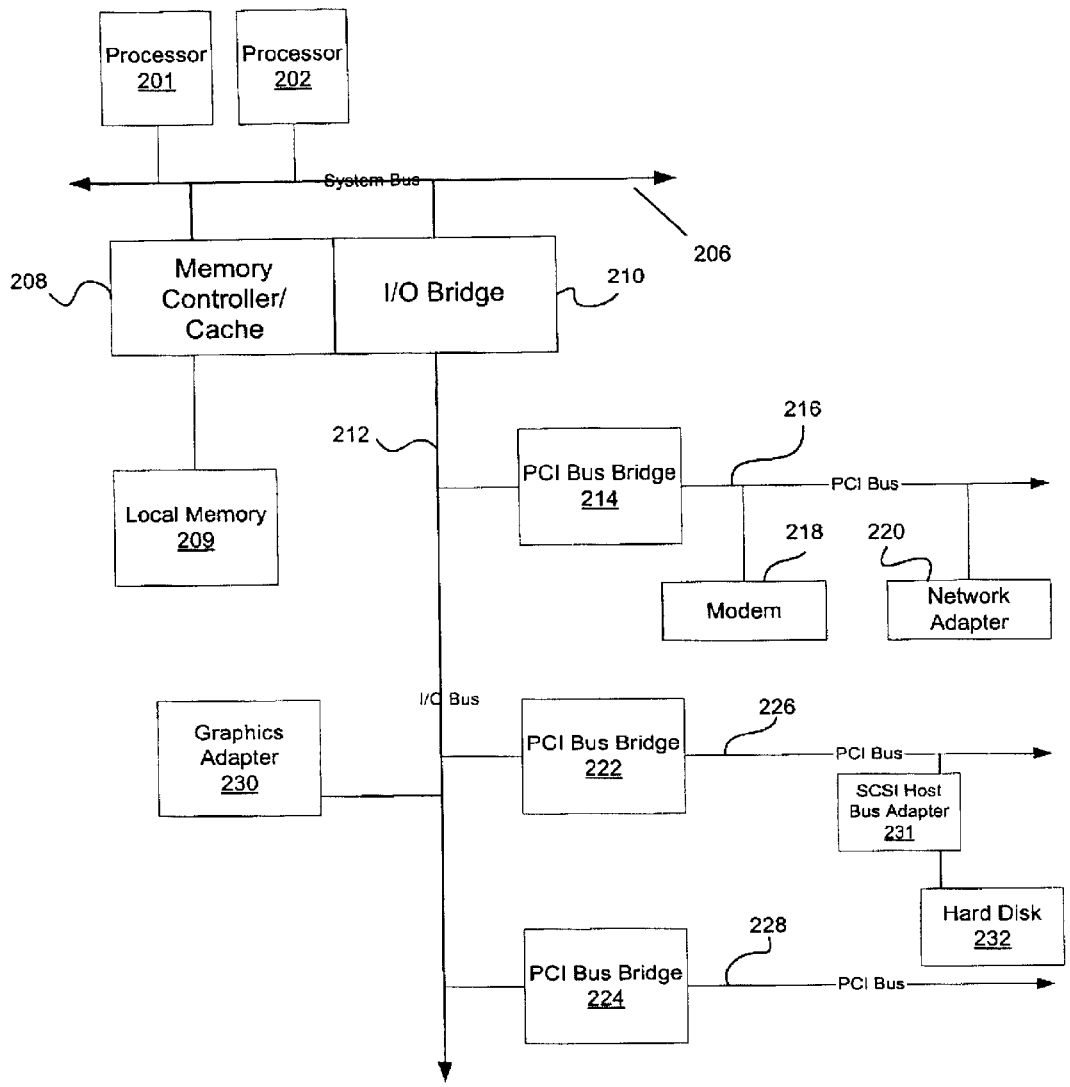
FIG. 2A is an example block diagram illustrating hierarchically organized internal components of a server-type data processing system that may implement the present invention.

With reference now to FIG. 2A, a block diagram depicts hierarchically organized internal components of a server-type data processing system which may implement the present invention. Data processing system 200 may be a symmetric multiprocessor (SMP) system including a plurality of processors 201–202 connected to system bus 206. Processors 201–203 may be any suitable processor, such as a processor selected from the PowerPC family of processors. Memory controller/cache 208, which provides an interface to local memory 209, is also connected to system bus 206. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors.

Additional PCI bus bridges 222 and 224 provide interfaces for additional PCI buses 226 and 228, from which additional modems or network adapters may be supported. A memory-mapped graphics adapter 230 may also be connected to I/O bus 212 as depicted, either directly or indirectly. Hard disk 232 may be connected to SCSI Host Bus Adapter 231, which is connected to one of the PCI buses.

Figure 2B:
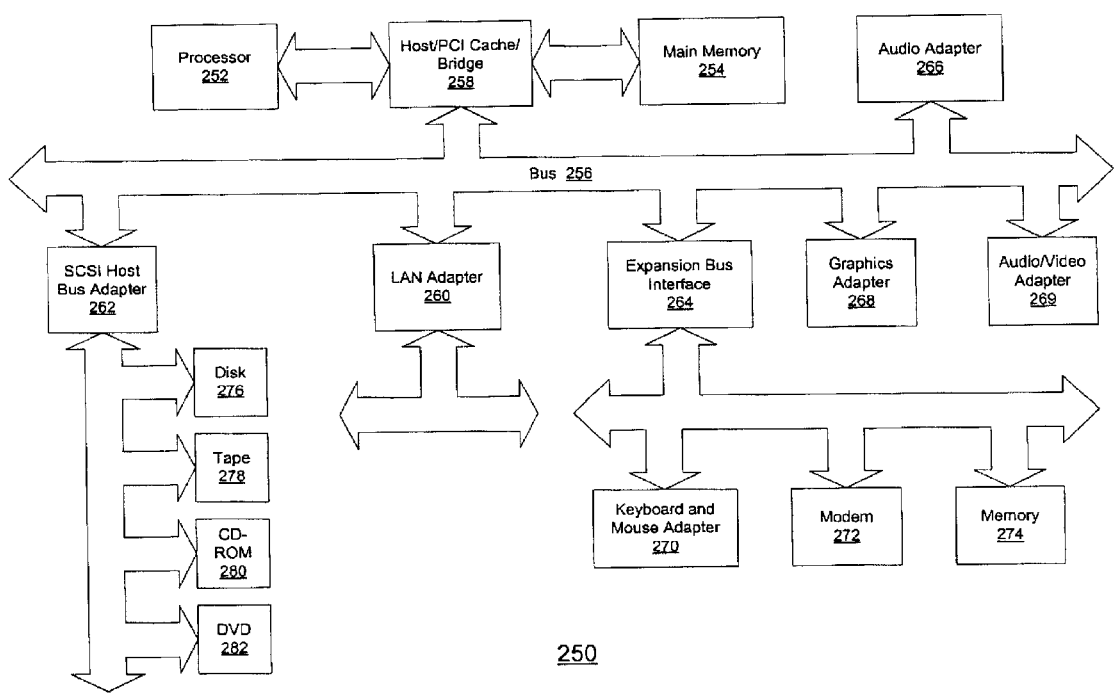
FIG. 2B is an example block diagram illustrating hierarchically organized internal components of a client-type data processing system that may implement the present invention.

With reference now to FIG. 2B, a block diagram depicts hierarchically organized internal components of a client-type data processing system which may implement the present invention. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. Instructions for an operating system and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2A or FIG. 2B may vary depending on the implementation. For example, other peripheral devices may be used in addition to or in place of the hardware depicted in FIG. 2B. The depicted examples are not meant to imply architectural limitations with respect to the present invention.

Figure 3:
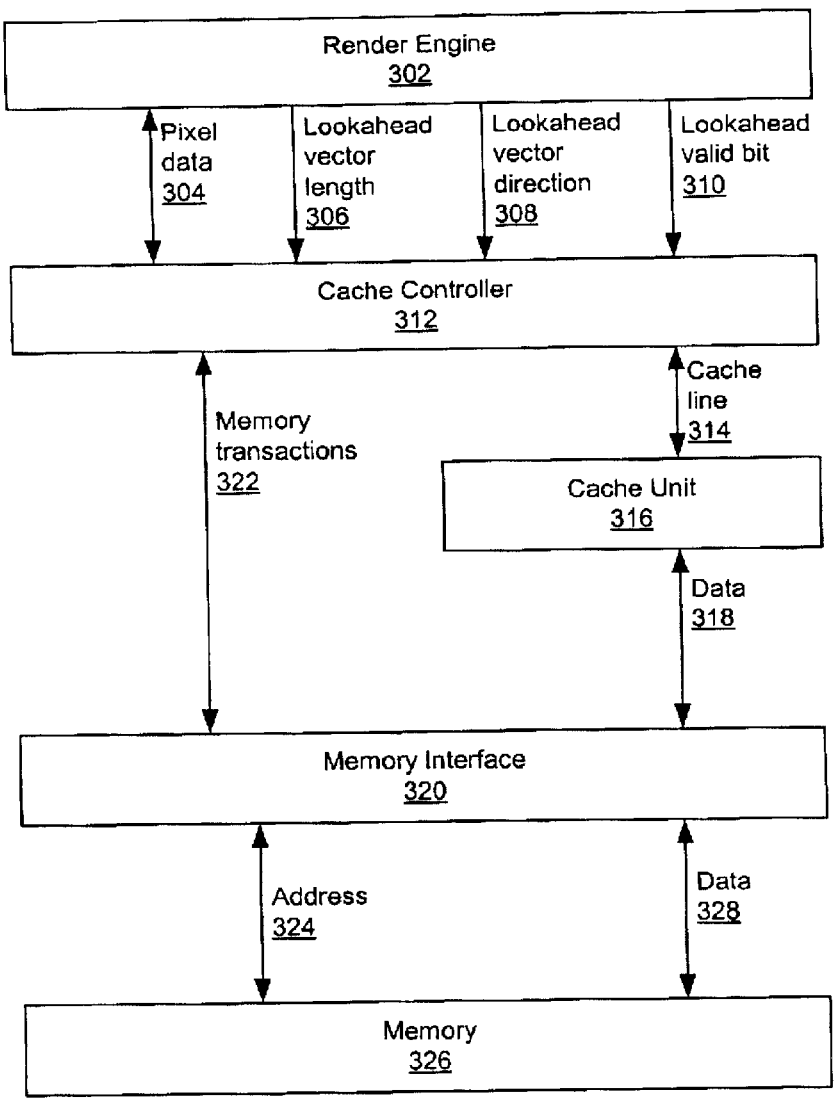
FIG. 3 is a block diagram depicting a portion of a graphics subsystem containing a render engine with lookahead generation that operates in conjunction with a lookahead cache controller in accordance with the present invention.

With reference now to FIG. 3, a block diagram depicts a portion of a graphics subsystem containing a render engine with lookahead generation that operates in conjunction with a lookahead cache controller in accordance with the present invention. Render engine 302, cache controller 312, and cache unit 316 may be contained within a graphics card, graphics subsystem, or graphics adapter, such as graphics adapter 268 shown in FIG. 2B.

Render engine 302 renders graphic images containing graphic primitives or other graphic objects under the command of a graphics device driver or other graphics software. Render engine 302 contains fill algorithms and fill rules for generating the pixels of the rendered image. Render engine 302 may contain a state machine for applying the fill rules and fill algorithms. As the render engine determines the pixel operations, it generates pixel data that includes an X-Y coordinate of a pixel within the coordinate space of the display and the pixel's associated characteristic data, which may include color data, transparency data, Z-buffer data, etc. In accordance with a preferred embodiment of the present invention, render engine 302 also generates a length vector length (or lookahead length) 306, a lookahead vector direction (or lookahead direction) 308, and a lookahead valid bit/flag 310. Lookahead length 306 provides the length of a remaining span in which pixel 304 is contained. As render engine 302 moves from one pixel to a succeeding pixel within a particular span, lookahead length 306 is decremented to indicate the number of pixels which remain to be rendered within the span.

Lookahead direction 308 is correlated with the coordinates of the current pixel or the current span and provides an indication of future rendering to be completed approximately following the rendering of the current pixel or of the current span. Preferably, lookahead direction 308 is the direction from the current pixel of the current span to a pixel on which a pixel operation will be performed within a threshold number of pixel operations from the current pixel.

Alternatively, lookahead direction 308 is the direction to the first pixel of the next span with respect to the current pixel of the current span. As another alternative mode of operation, lookahead direction 308 is the direction of the first pixel of the next span with respect to the last pixel of the current span, which may be used in conjunction with the remaining length of the current span to determine a memory location or cache line or cache tile of the first pixel of the next span.

Lookahead valid bit 310 provides an indication of the validity of the signals for lookahead length 306 and lookahead direction 308. From a different perspective, lookahead valid bit 310 provides an indication of subsequent pixel operations to be performed by render engine 302. As render engine 302 traverses the current span, lookahead valid bit 310 indicates that render engine 302 will perform succeeding pixel operations in close proximity to the current pixel operation and the associated lookahead information has been computed.

Cache controller 312 accepts as input pixel data 304, lookahead length 306, lookahead direction 308, and lookahead valid bit 310. Cache controller 312 prefetches cache lines in anticipation of subsequent pixel operations to pixels within those cache lines. In this manner, cache controller 312 pipelines data for render engine 302. Cache controller 312 sends cache lines 314 and associated tags to cache unit 316 that buffers pixel data in units of cache lines. Cache unit 316 sends and receives data 318 from memory interface 320 in conjunction with memory transactions 322 that contain read/write requests and associated addresses from cache controller 312. Memory interface 320 sends address 324 to memory 326 and sends or retrieves data 328 from memory 326 depending upon the nature of the memory transaction. Cache unit 316 stores data 318 as appropriate for eventual retrieval by cache controller 312 for forwarding to render engine 302.

Cache controller 312 uses the lookahead information from render engine 302 to determine the appropriate memory transactions to be requested of memory interface 320 or to determine operations to be performed with cache unit 316. Lookahead valid bit 310 provides an indication to cache controller 312 as to whether cache controller 312 should perform a cache operation for subsequent pixel operations to be generated by render engine 302. If lookahead valid bit 310 is active, cache controller 312 will use lookahead direction 308 and lookahead length 306 when appropriate to determine the cache operation or memory transaction, depending upon the cache replacement algorithm.

Although the cache controller described above operates upon cache lines, the cache lines may be generalized M×N arrays of arbitrary size. If N=1, then the array would be a cache line as is more commonly known. Otherwise, the generalized two-dimensional array may be termed a cache tile. By knowing the location of a current pixel operation and the size of the cache tiles, the cache controller is able to use the lookahead information from the render engine to determine appropriate cache operations and memory transactions. Caching pixels in this manner helps to increase memory bandwidth utilization by helping to relieve memory idle cycles and read/width turnaround latency of the external graphics memory. The efficiencies provided by the cache controller become greater and more effective during the rendering of graphic objects larger than a few or merely several pixels. The, manner in which cache controller 312 determines its actions is described in more detail in U.S. application Ser. No. 09/163,921, entitled "System and Method for Cache Line Replacement", filed Sep. 30, 1999, and is hereby incorporated by reference. The manner in which render engine 302 determines the activation in content of lookahead length 306, lookahead direction 308, and lookahead valid bit 310 is described in more detail further below.

Figure 4:
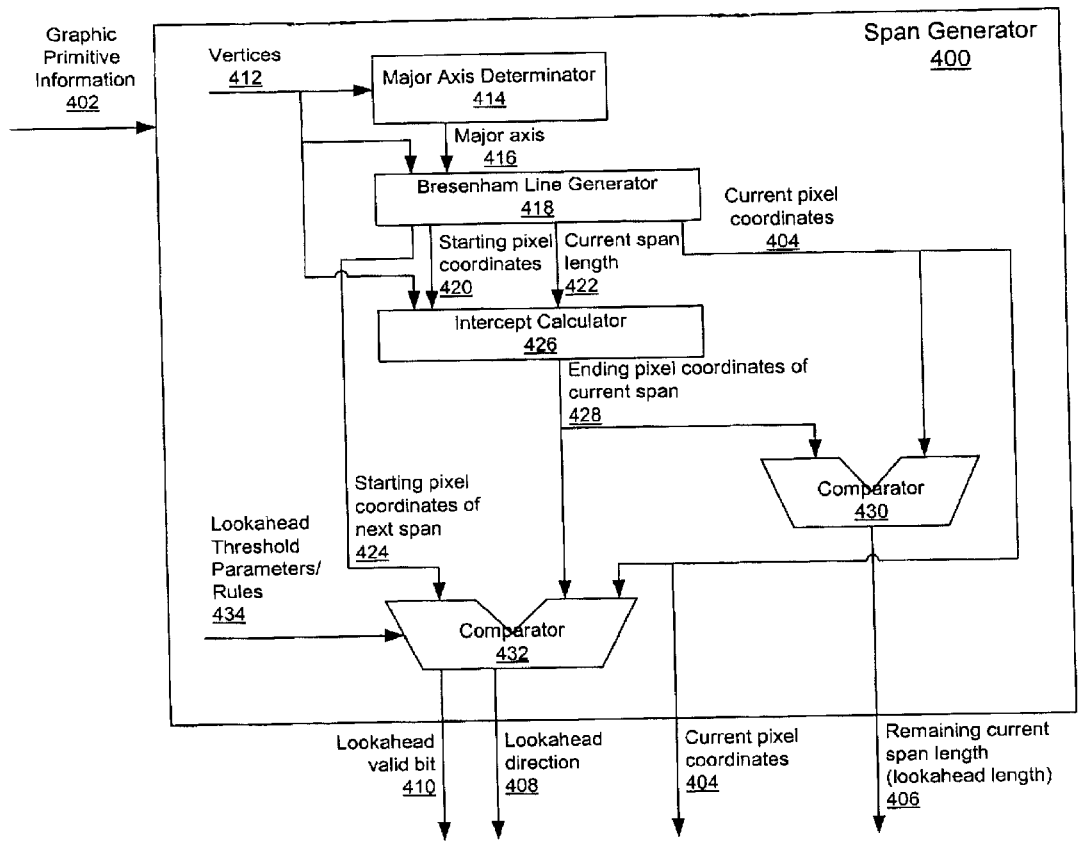
FIG. 4 is a block diagram depicting a span generator within a render engine that provides lookahead information in accordance with a preferred embodiment of the present invention.

With reference now to FIG. 4, a block diagram depicts a span generator within a render engine that provides lookahead information in accordance with a preferred embodiment of the present invention. Span generator 400 may be contained within a render engine, such as render engine 302 shown in FIG. 3, or span generator 400 may be alternately configured by being placed within a graphics card, graphics subsystem, or graphics adapter, such as graphics adapter 268 shown in FIG. 2B.

Span generator 400 accepts as input graphic primitive information 402 that may include lines, triangles, arcs, or other graphic objects to be rendered. In response, span generator 400 produces current pixel coordinates 404, remaining current span length 406, lookahead direction 408, and lookahead valid bit 410.

Span generator 400 determines a set of vertices 412 that define a graphic object to be rendered. Vertices 412 are contained within graphic primitive information 402. FIG. 4 is directed to fill operations for vertex-oriented primitives. In general, the overall operation of the span generator is dependent upon the implementation of the state machine within the render engine or fill engine. Alternatively, span generator 400 uses appropriate starting points for rendering a current graphic object.

Major axis determinator 414 accepts vertices 412 and determines major axis 416 that is supplied to Bresenham line generator 418, which walks along major axis 416 to determine the actual screen coordinates that lie upon the major axis 416 and horizontal spans that originate from the rendered line representing major axis 416. Bresenham line generator 418 also accepts vertices 412 to determine several data items associated with each span anchored on major axis 416. One of the data items produced by Bresenham line generator 418 is starting pixel coordinates 420, i.e. the coordinates of the starting pixel of the current span, which is also equal to a pixel on the rendered line representing major axis 416. Bresenham line generator 418 also produces current span length 422, i.e. the length of the current span as a number of pixels to be rendered for the span. In addition, Bresenham line generator 418 also produces current pixel coordinates 404 for the current pixel to be rendered within the current span. Current pixel coordinates 404, starting pixel coordinates 420, and current span length 422 may be generated and output for use by other components for generating lookahead information. While these components are computing the lookahead information, Bresenham line generator 418 may compute next span starting pixel coordinates 424 that identifies the starting pixel of the span to be rendered subsequent to the completion of the rendering of the current span.

As mentioned above, span generator 400 uses methodology appropriate for the graphic object that is being rendered.

For example, as is well known, not all graphic objects are based solely on vertices. Rectangle object generation generally uses rectangle primitives, which can be based on start (x,y) coordinates and associated width and height parameters or based on multiple (x,y) coordinates, which are specific to the upper left and lower right coordinates of the rectangle object but could vary depending upon implementation. Rectangle primitives do not require a Bresenham computation, i.e. there is no need to determine a major axis as rectangle primitives are always given in real screen space. However, a rectangle primitive would still require a line or pixel generator.

Intercept calculator 426 accepts vertices 412, current span starting pixel coordinates 420, and current span length 422 in order to generate ending pixel coordinates 428 that identifies the last pixel to be rendered for the current span. By knowing vertices 412, intercept calculator 426 can compute a minor axis of the current graphic object that is being rendered. By knowing the starting pixel coordinates of the current span and the length of the current span, intercept calculator 426 can compute the pixel at which the current span and the minor axis will intersect. The intersection point determines the last pixel coordinates of the current span.

Comparator 430 accepts current pixel coordinates 404 and ending pixel coordinates 428 to compute remaining current span length 406. As Bresenham line generator 418 generates the coordinates of the current pixel within the current span, comparator 430 repeatedly compares the current location to the ending location of the current span in order to repeatedly produce the number of pixels within the current span that remain to be rendered.

Comparator 432 accepts current pixel coordinates 404, ending pixel coordinates 428, and next span starting pixel coordinates 424 in order to generate lookahead information. By comparing the orientation of the current pixel, the last pixel of the current span, and the starting pixel of the next span, comparator 432 is able to determine the orientation or direction of a lookahead vector that provides an indication of the subsequent operations to be performed while rendering pixels approximately following the current pixel.

Comparator 432 uses lookahead threshold parameter/rules 434 to determine the appropriate actions to be performed based on parameters 434, next span starting coordinates 424, and ending pixel coordinates 428. In this manner, comparator 432 may be configured to vary its mode of operation with respect to the lookahead generation. For example, the lookahead parameters may contain a threshold number of pixels that provide a leading boundary horizontally from the current pixel, such as three pixels forward of the current pixel. If the leading boundary ahead of the current pixel matches or is past the end of the current span, then comparator 432 switches its lookahead generation mode of operation in order to provide a lookahead direction to the next span to be rendered. By varying this threshold, span generator 400 may be configurable to provide lookahead information tailored to the operation of a particular cache controller or memory subsystem. As another example, comparator 432 may accept configuration information or signals specifying various rules, such as lookahead generation is turned off except with a certain threshold of switching spans. By using this type of rule, span generator 400 may be configured to work in conjunction with a cache controller or memory subsystem that performs standard consecutive prefetch operations at succeeding memory references except when the lookahead valid bit is activated.

As a byproduct of the production of lookahead direction 408, comparator 432 can determine whether or not any pixels in close proximity to the current pixel are to be rendered approximately following the rendering of the current pixel. If so, lookahead valid bit 410 is activated. Otherwise, lookahead valid bit 410 is inactive, which indicates that lookahead direction 408 does not provide an active signal or useful information. In this manner, span generator 400 is able to provide an indication of subsequent pixel operations that may be used by other components within the render engine or graphics subsystem, such as an appropriately configured cache controller that may use the lookahead information to prefetch pixel data into a cache unit.

Figure 5:
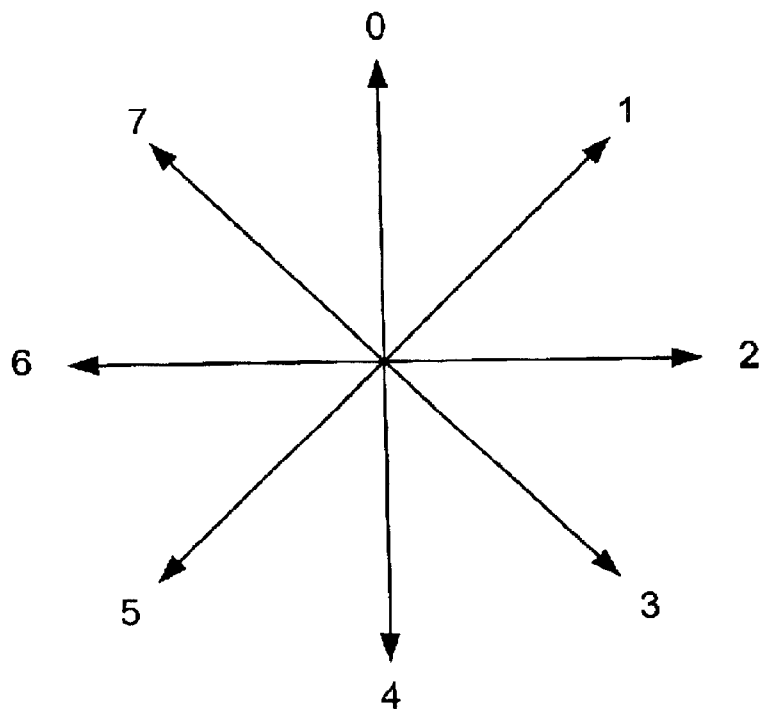
FIG. 5 is a diagram showing a "compass" of encoded directional values that a span generator may use in specifying a lookahead movement direction while rendering a span.

With reference now to FIG. 5, a diagram shows a "compass" of encoded directional values that a span generator may use in specifying a lookahead movement direction while rendering a span. This type of directional encoding is similar to the encoding used while performing other types of pixel operations in related aspects of computer graphics.

Figure 6:
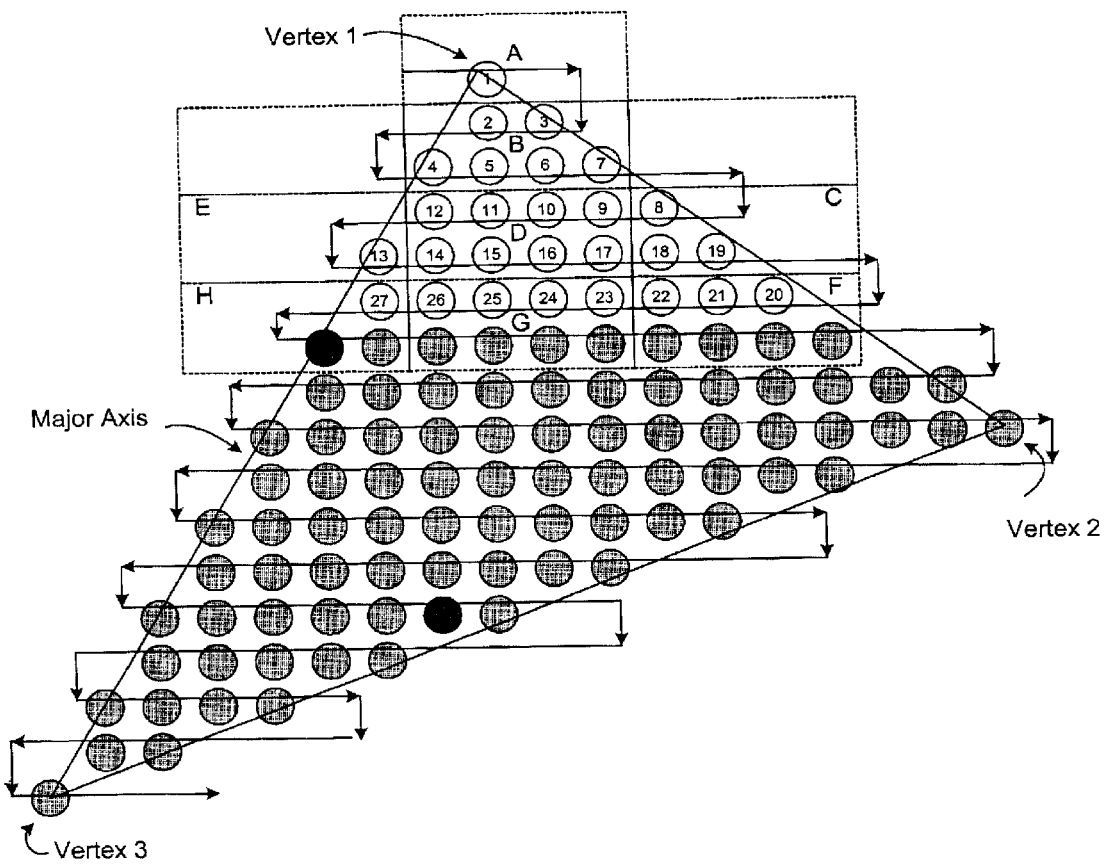
FIG. 6 is an exemplary set of pixels showing the order of pixel operations performed by a span generator and the location of the pixel operations within a set of cache tiles.

With reference now to FIG. 6, an exemplary set of pixels shows the order of pixel operations performed by a span generator and the location of the pixel operations within a set of cache tiles. A triangle object is used as an example of a graphic object that is to be rendered by a render engine using a span generator in accordance with a preferred embodiment of the present invention. The triangle object is defined by a set of vertices: vertex 1, vertex 2, and vertex 3. It may be assumed that the render engine follows the convention in which the rendering begins from top left and proceeds horizontally. Hence, the line defined by vertex 1 and vertex 3 define the major axis which a Bresenham line generator walks to generate a left edge of the triangle and to generate information associated with each of the horizontal spans: a starting pixel coordinate of the current span; a span length in number of pixels of the current span; and a current pixel to be generated, rendered, or otherwise operated on within the current span.

Because the physical memory layout is known, it is possible to determine the exact memory address of any given pixel point on the screen and its associated cache tile. Since the rendering of an object requires certain fill rules to be followed, the rendering engine has a prior knowledge of the location of the next pixels to be drawn for the object. The length vector is known because rendering is done on a line-by-line basis, regardless of whether or not its horizontally drawn or vertically drawn. The length of a span is an artifact of the start position of the span and the span's intercept into the line described by one of the three lines connecting the vertices. Knowing these two conditions, the cache controller uses the lookahead information to attempt to make cache reads, i.e. lookaheads, during cache "hits" during rendering. This can significantly improve rendering speed dependent upon the size of the object being drawn. Additionally, lookahead operations may be turned off via manual override into a user-defined register.

The cache controller prefetches sets of pixels into the cache, and the data unit upon which the cache controller operates are cache tiles. As shown in FIG. 6, cache tiles A–H of size 4×2 are "overlaying" the pixels to be rendered for the triangle. Within the graphical depiction in FIG. 6, a pixel's spatial inclusion within an overlaying cache tile means that the memory address for the pixel is in the same physical memory block, i.e. is included in that cache tile according to the operation of the system. When a cache controller determines that the pixel data should be prefetched into the cache, a complete tile is retrieved. When the cache controller determines that a "dirty" or modified cache tile should be written back to memory, the cache controller writes an entire cache tile.

FIG. 6 also shows arrows through the pixels of the triangle that provide the direction and order in which the span generator moves from pixel to pixel to render the triangle. Each pixel in the first six spans have been given an ordinal number representing the order in which the span generator will select the pixel for rendering. Cache tile A contains pixel 1. Cache tile B contains pixels 2–7. Cache tile C contains pixels 8, 18, and 19. Cache tile D contains pixels 9–12 and 14–17. Cache tile E contains pixel 13. Cache tile F contains pixels 20–22. Cache tile G contains pixels 23–26. Cache tile H contains pixel 27.

The following description provides an exemplary set of memory operations for some of the pixels shown in FIG. 6. In this context, the span generator or the render engine could be considered as the component that is responsible for generating the span information that is supplied to the cache controller.

Initially, the span generator dispatches a pixel operation (pixel 1) with the lookahead valid bit turned off. The lookahead valid bit is turned off in accordance with preconfigured rules within the rendering engine, e.g., the span generator does not turn on lookahead functions for dispatched pixels that are within certain threshold parameters for short spans. In this case, pixel 1 is the only pixel in the span, so it is also the ending point of the span. There is no associated lookahead direction because the lookahead valid bit is turned off.

The span generator then dispatches pixel operations for the next two pixels in succession (pixels 2 and 3) on the next span, again with lookahead off given the proximity of the pixels to the end of the span.

The span generator then dispatches a next pixel operation (pixel 4), and the lookahead valid bit is again off. In this case, it is assumed that the lookahead functionality requires a specific amount of setup time to compute the next starting point of the next span before a lookahead determination may be made. Hence, the span generator is not able to provide a lookahead valid signal for the first pixel of the current span, so the signal is inactive. Alternatively, given the ability to accommodate the overhead necessary to do such computation in parallel with previous operations, the first pixel of a span could have an accurate lookahead indication.

The span generator then dispatches a next pixel operation (pixel 5), but in this case, the lookahead valid bit is on, and the pixel operation also includes a lookahead direction of 3 and a span length of 3. Although the span generator is marching along the span in direction 2, when the span generator reaches pixel 5, it is already within a predetermined threshold distance of the end of the span. Since the starting coordinate of the next span is known by the time that the span generator reaches the current pixel (pixel 5) within the span, the span generator is able to indicate the next span on which it is going to operate within a preconfigured number of pixels. Hence, the span generator signals that it will be moving to a new span and indicates the direction at which the starting point of the new span may be found. In this case, given the current pixel (pixel 5), the starting pixel (pixel 8) of the next span is found in direction 3.

The span generator then dispatches a next pixel operation (pixel 6), and again, the lookahead valid bit is on, the lookahead direction is 3, and the span length is 2. The next pixel operation (pixel 7) also has the lookahead valid bit on, the lookahead direction is 3, and the span length is 1.

The span generator then begins the next span at the beginning pixel (pixel 8) of the span, and the lookahead indicator is off. When the span generator reaches pixel 9, the starting point of the next span is known, so the span generator issues a pixel operation with the lookahead valid bit turned on, the remaining span length set to 4, and the direction set to 6. In this case, the current pixel is not close to the end of the span, so the span generator indicates any operations performed on the lookahead signals should be focused on the current span as there are a number of pixels remaining in the span before the span generator moves within a threshold distance of the end of the span.

The span generator then dispatches a next pixel operation (pixel 10), and again, the lookahead valid bit is on and the span length is 3, but the lookahead direction has changed to 5. In this case, pixel 10 is already within a threshold distance of the end of the span, so the lookahead direction has already changed.

The span generator then dispatches a next pixel operation (pixel 11), and the lookahead valid bit is on, the lookahead direction is 5, and the span length is 2. The span generator then dispatches a next pixel operation (pixel 12), and again, the lookahead valid bit is on, the lookahead direction is 5, and the span length is 1.

The span generator then begins the next span at the beginning pixel (pixel 13) of the span, and the lookahead indicator is off. When the span generator reaches pixel 14, the starting point of the next span is known, so the span generator issues a pixel operation with the lookahead valid bit turned on, the lookahead direction set to 2, and the remaining span length set to 6. The pixel operations for pixel 15 and pixel 16 are similar to pixel 14. When the span generator issues a pixel operation for pixel 17, pixel 17 is within a threshold distance of the end of the span, so the lookahead direction changes to 3. The pixel operations for pixels 18 and 19 also include a lookahead direction of 3.

The lookahead valid bit is off for pixel 20, but for pixel 21, the lookahead valid bit is on and the lookahead direction is 6. Pixels 22–24 have the same lookahead information as pixel 21. For pixel 25, the lookahead direction changes to 5 as the span generator approaches the end of the span and prepares to move to the next span. Pixels 26 and 27 also have lookahead direction equal to 5.

The advantages of the present invention should be apparent with reference to the detailed description provided above. A graphics subsystem can generate lookahead information based on a state of the graphics subsystem. The graphics subsystem follows a set of rules according to which graphic objects are rendered and filled. By providing lookahead information based on its state, the graphics subsystem can indicate its intentions prior to performing the intended actions. Other components within a data processing system may use the lookahead information for various purposes. For example, the memory subsystem may perform memory caching operations based on a current state of memory, a current memory operation, and the lookahead information. Given that the memory operations concern pixel operations, a cache controller may cache pixel data in the appropriate data units, such as cache tiles, based on the lookahead information. By prefetching pixels into a cache unit prior to a graphics processor reading or writing the pixels, the graphics processor experiences more frequent cache hits and fewer cache misses, thereby improving the processing efficiency,of the graphics subsystem.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating a pixel operation in a data processing system, the method comprising the computer-implemented steps of:

generating characteristic data for the pixel operation;
   generating coordinate data for the pixel operation;
   generating lookahead data correlated with the coordinate data; and
   requesting the pixel operation comprising the characteristic data, the coordinate data, and the lookahead data;
   wherein the lookahead data provides an indication of a subsequent pixel operation to be performed.

2. The method of claim 1 wherein the characteristic data comprises one or more data items selected from the group consisting of a color value associated with a pixel; a transparency value associated with a pixel; and a Z-buffer depth associated with a pixel.

3. The method of claim 1 wherein the coordinate data are numerical values representing a coordinate point in an image coordinate space or display coordinate space.

4. A method for generating a pixel operation in a data processing system, the method comprising the computer-implemented steps of:

generating characteristic data for the pixel operation;
   generating coordinate data for the pixel operation;
   generating lookahead data correlated with the coordinate data; and
   requesting the pixel operation comprising the characteristic data, the coordinate data, and the lookahead data;
   wherein the lookahead data comprises a lookahead vector and a lookahead valid flag.

5. The method of claim 4 wherein the lookahead vector comprises one or more data items selected from the group consisting of: a lookahead direction; and a lookahead length.

6. The method of claim 5 wherein the lookahead valid lag indicates whether associated lookahead data is valid for the pixel operation.

7. The method of claim 5 further comprising:
   generating the lookahead length based on a remaining number of pixels to be rendered for a span that includes a pixel subject to the pixel operation.

8. The method of claim 5 further comprising:
   generating the lookahead direction based on a spatial relationship between the coordinate data for the pixel operation and coordinate data for an approximately following pixel operation.

9. The method of claim 5 further comprising:
   generating the lookahead direction based on the coordinate data of the pixel operation and coordinate data for a pixel operation to be performed within a threshold number of pixels operations from the pixel operation.

10. An apparatus for generating a pixel operation in a data processing system, the apparatus comprising:

first generating means for generating characteristic data for the pixel operation;
    second generating means for generating coordinate data for the pixel operation;
    third generating means for generating lookahead data correlated with the coordinate data; and
    requesting means for requesting the pixel operation comprising the characteristic data, the coordinate data, and the lookahead data.

11. The apparatus of claim 10 wherein the characteristic data comprises one or more data items selected from the group consisting of: a color value associated with a pixel; a transparency value associated with a pixel; and a Z-buffer depth associated with a pixel.

12. The apparatus of claim 10 wherein the coordinate data are numerical values representing a coordinate point in an image coordinate space or display coordinate space.

13. An apparatus for generating a pixel operation in a data processing system, the apparatus comprising:

first generating means for generating characteristic data for the pixel operation;
    second generating means for generating coordinate data for the pixel operation;
    third generating means for generating lookahead data correlated with the coordinate data; and
    requesting means for requesting the pixel operation comprising the characteristic data, the coordinate data, and the lookahead data;
    wherein the lookahead data comprises a lookahead vector and a lookahead valid flag.

14. The apparatus of claim 13 wherein the lookahead vector comprises one;or more data items selected from the group consisting of: a lookahead direction; and a lookahead length.

15. The apparatus of claim 14 wherein the lookahead valid flag indicates whether associated lookahead data is valid for the pixel operation.

16. The apparatus of claim 14 further comprising:
    fourth generating means for generating the lookahead length based on a remaining number of pixels to be rendered for a span that includes a pixel subject to the pixel operation.

17. The apparatus of claim 14 further comprising:
    fifth generating means for generating the lookahead direction based on a spatial relationship between the coordinate data for the pixel operation and coordinate data for an approximately following pixel operation.

18. The apparatus of claim 14 further comprising:
    sixth generating means for generating the lookahead direction based on the coordinate data of the pixel operation and coordinate data for a pixel operation to be performed within a threshold number of pixels operations from the pixel operation.

19. A computer program product in a computer-readable medium for use in a data processing system for generating a pixel operation, the computer program product comprising:

first instructions for generating characteristic data for the pixel operation;
    second instructions for generating coordinate data for the pixel operation;

third instructions for generating lookahead data correlated with the coordinate data; and fourth instructions for requesting the pixel operation comprising the characteristic data, the coordinate data, and the lookahead data.

20. A computer program product in a computer-readable medium for use in a data processing system for generating a pixel operation, the computer program product comprising:

first instructions for generating characteristic data for the pixel operation;

second instructions for generating coordinate data for the pixel operation;

third instructions for generating lookahead data correlated with the coordinate data; and fourth instructions for requesting the pixel operation comprising the characteristic data, the coordinate data, and the lookahead data wherein the lookahead data comprises a lookahead vector and a lookahead valid flag.

21. The computer program product of claim 20 wherein the lookahead vector comprises one or more data items selected from the group consisting of: a lookahead direction; and a lookahead length.

22. The computer program product of claim 21 further comprising:

instructions for generating the lookahead direction based on the coordinate data of the pixel operation and coordinate data for a pixel operation to be performed within a threshold number of pixels operations from the pixel operation.

23. The method of claim 1, wherein when a validity bit of the lookahead data is valid, the lookahead data for a succeeding pixel operation has been computed.

24. The method of claim 1, wherein the lookahead data is generated from current pixel coordinates, ending pixel coordinates, and a next span starting pixel coordinates.

* * * * *

UNITED STATES PATENT AND TRADEMARK OFFICE
CERTIFICATE OF CORRECTION

PATENT NO.   : 6,654,022 B1
DATED        : November 25, 2003
INVENTOR(S)  : Egan It is certified that error appears in the above-identified patent and that said Letters Patent is hereby corrected as shown below:

Column 11,
Line 32, after "consisting of", insert -- : --.
Line 52, after "valid", delete "lag" and insert -- flag --.

Column 12,
Line 10, after "coordinate data", delete ";" and insert -- , wherein the lookahead data is generated for each pixel included in the pixel operation; --.
Line 36, after "one" delete ";".

Column 13,
Line 2, after "coordinate data", delete ";" and insert -- , wherein the lookahead data is generated for each pixel included in the pixel operation; --.

Signed and Sealed this

Thirtieth Day of May, 2006

JON W. DUDAS
*Director of the United States Patent and Trademark Office*